Aug. 6, 1968     I. B. WEISE ET AL     3,395,727
CHECK VALVE
Filed March 1, 1965     2 Sheets-Sheet 1
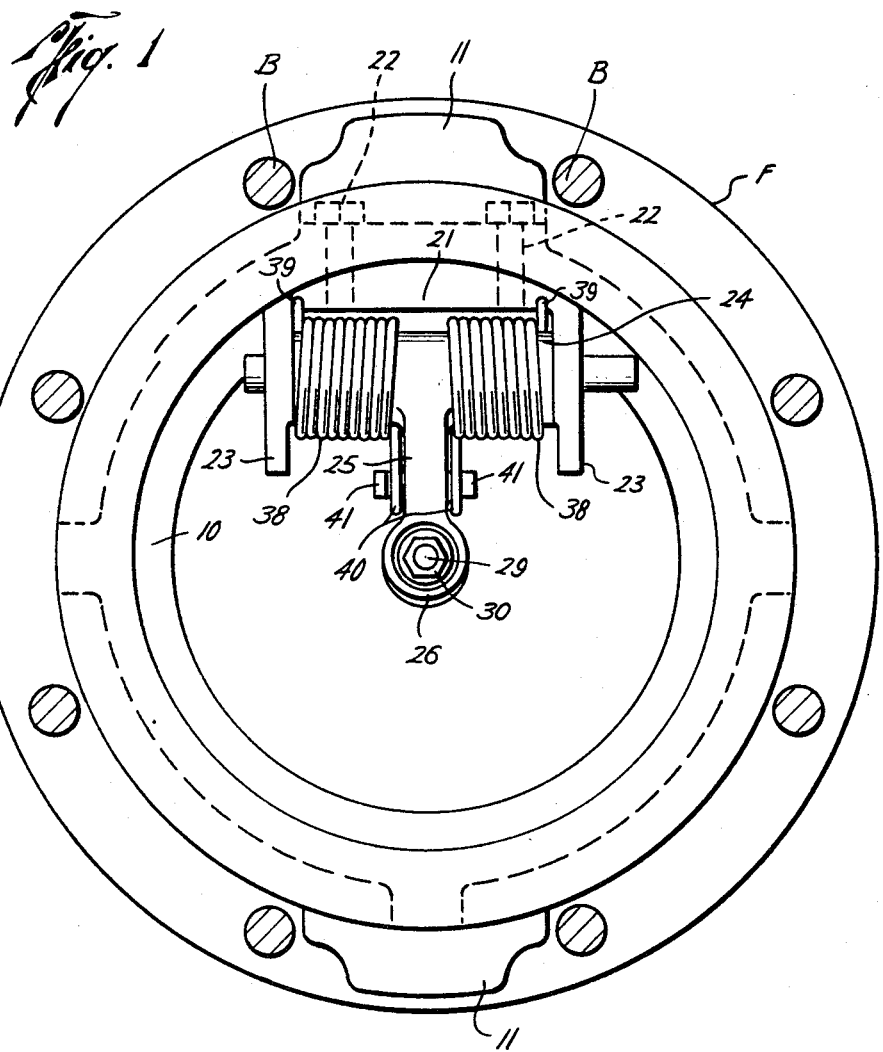
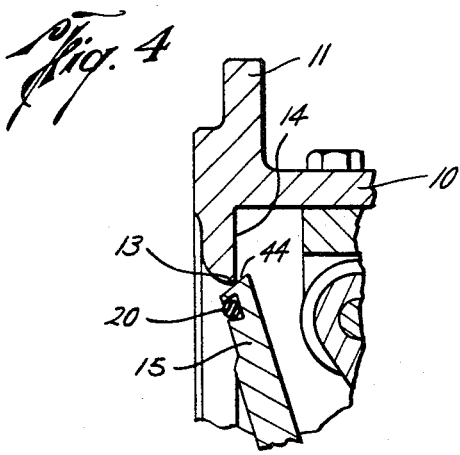
Irvin B. Weise
Henry G. Butler
INVENTORS
BY
ATTORNEY Aug. 6, 1968     I. B. WEISE ET AL     3,395,727
CHECK VALVE
Filed March 1, 1965     2 Sheets-Sheet 2
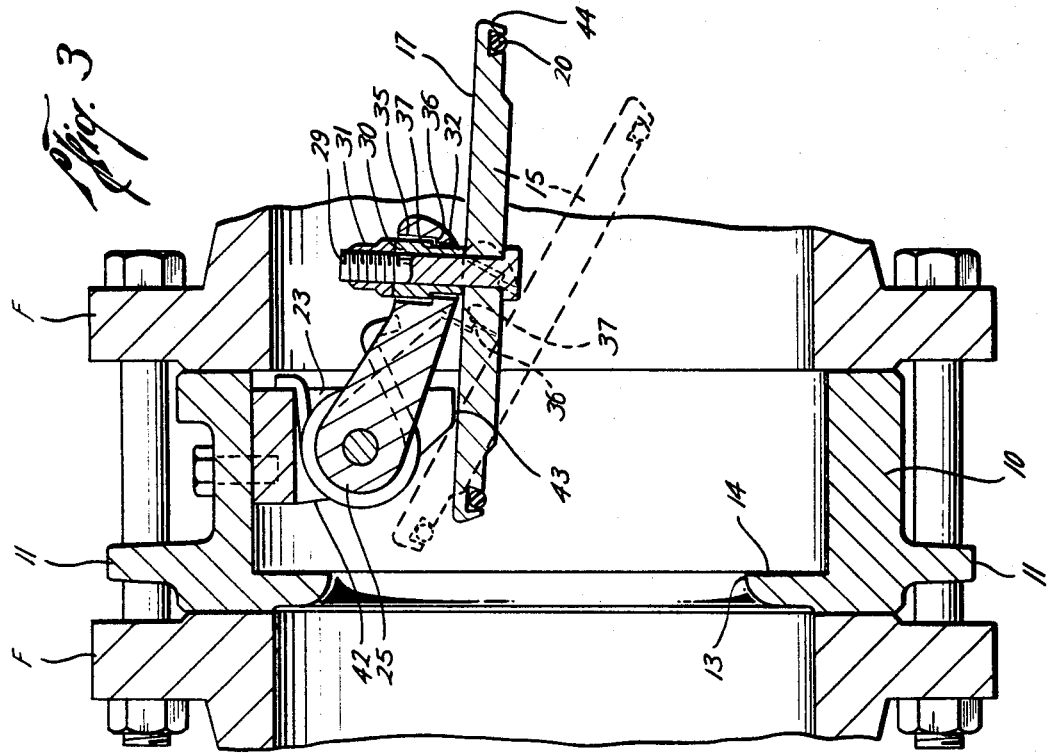
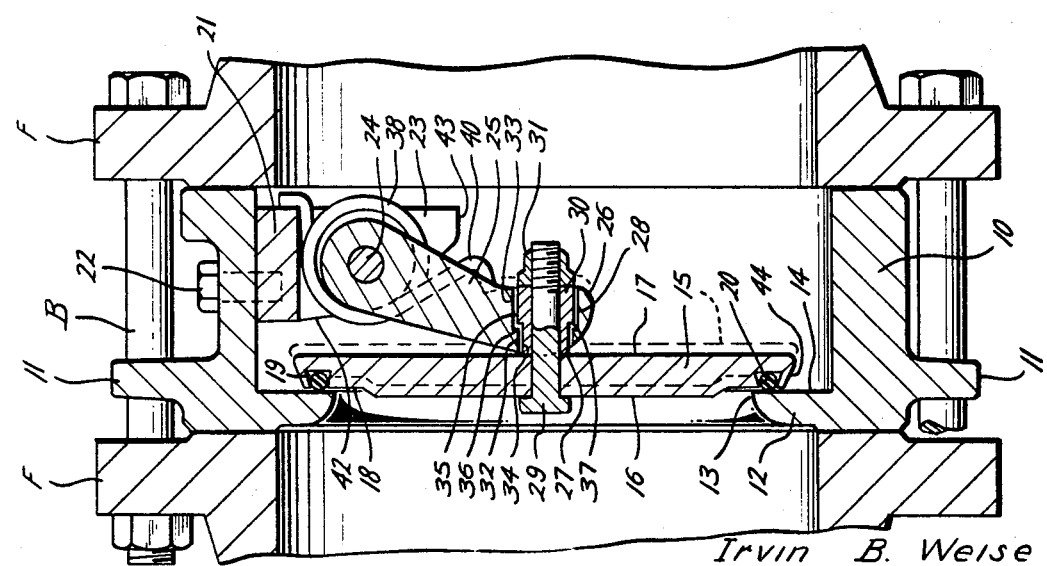
Irvin B. Weise
Henry G. Butler
INVENTORS
BY
ATTORNEY 3,395,727
CHECK VALVE
Irvin B. Weise, Bellaire, and Henry G. Butler, Houston, Tex., assignors to Anderson Greenwood & Co., Houston, Tex., a corporation of Texas
Filed Mar. 1, 1965, Ser. No. 435,872
6 Claims. (Cl. 137—527.4)

ABSTRACT OF THE DISCLOSURE

A flapper-type check valve employing a specialized form of lost-motion connection between the closure plate and its hinge arm, the connection being operative to allow some angular movement of the closure plate relative to the seat through only a very limited portion of its travel in its initial opening and final closing movements.

---

This invention relates to check valves and more particularly to flapper-type check valves.

Conventional flapper-type check valves include a generally circular closure plate hingedly mounted to swing toward and away from an annular seat to limit fluid flow through the valve in only one direction. The hinge axis is generally eccentrically located with respect to the axis of the seat with the result that the initial unseating movement of the closure plate produces some lateral wiping or dragging movement of the closure plate over a portion of the seat, thereby often causing uneven wear of the seat with consequent leakage and necessity for early repair or replacement.

The present invention has for its primary object the provision of an improved check valve construction which obviates difficulties, such as those mentioned, found in more conventional structures.

A principal object is to provide a valve construction including a self-aligning closure plate having flow-stabilized, non-wiping action as it swings away from and returns to its seat whereby to prevent abrasion, wear and premature failure of the seat and to assure prolonged tight sealing by the closure plate.

A further object is to provide a check valve including a flapper-type closure plate which is spring biased in the closing direction and employs a lost-motion connection of novel form between the closure plate and the supporting hinge arm or link to prevent undue wear on the engaging faces of the seat and closure plate.

An important object is the provision of a hinged mounting structure for the closure plate including a lost-motion connection between the closure plate and its hinged supporting link which permits the closure plate to be lifted fully and directly away from the seat upon initial application to the closure plate of fluid pressure in the opening direction.

Another object is the provision of a check valve of the class described in which the lost-motion connection between the closure plate and its hinged supporting link includes a stem member projecting axially rearwardly of the closure plate and receivable in an opening in the free end of the supporting link, the opening in the latter being larger in diameter than the received portion of the stem member and provided with internal shoulder means engageable with cooperating shoulder means on the stem member to effectively absorb the lost-motion after the initial opening movement of the closure plate.

An additional object is the provision of a hinge mounting for the closure plate including means for limiting opening movement of the closure plate to a non-jamming position.

Yet another object is to provide a circular closure plate having a peripherally chamfered or bevelled shape adapted, in the event of failure of the biasing springs, to prevent the edge of the plate from jamming or hanging on the edge of the seat during closing movement of the closure plate.

Other and more specific objects and advantages will become more readily apparent when read in conjunction with the accompanying drawing which illustrates a useful embodiment in accordance with this invention.

In the drawing:

FIG. 1 is an elevational view of the valve looking toward the back face of the closure plate;

FIG. 2 is a longitudinal, cross-sectional view through the valve showing in full line the parts in the fully closed position, and in broken lines, the position of the parts after initial opening movement of the closure plate;

FIG. 3 is a view similar to FIG. 2, showing in full lines the parts in the fully open position of the valve and in broken lines a partially open position of the valve; and FIG. 4 is a fragmentary view, in section, of a detail illustrating another position of the parts.

Referring to the drawing, the valve comprises an annular body 10 constructed to be clamped between the flanged ends F—F of adjacent sections of a pipe line, fluid flow through which is to be controlled by the check valve. Body 10 is secured between flanges F—F by bolts B—B symmetrically disposed about the perimeter of the body, which is provided with oppositely projecting ears 11—11 adapted to extend between pairs of adjacent bolts to position the valve body for proper operation of the valve.

At one end of the body which, for purposes of this description will be described as the upstream end, the body is provided with an inwardly projecting annular flange 12 defining the axial flow port or orifice 13 through the valve and having a flat, rearwardly facing, annular surface constituting the seat 14 surrounding orifice 13. Orifice 13 is controlled by a closure plate 15 which is generally circular and relatively thin, having substantially flat forward and rear faces 16 and 17, respectively. Closure plate 15 is concentric with and somewhat larger in diameter than orifice 13 so as to concentrically extend over the edge of seat 14. The edge portion of forward face 16 of the closure plate overlying seat 14 is annularly relieved at 18 and this relieved surface is provided with an annular recess 19 adapted to receive an O-ring packing 20 of elastomeric composition material so that the latter will project slightly from the recess to sealingly engage the surface of seat 14 when the closure plate is in the closing position.

Closure plate 15 is swingably supported from body 10 of the valve by a suitable hinged support which includes a transverse bracket 21 which is secured to one side of the body 10 rearwardly of the closure plate by means of bolts 22. Bracket 21 carries a pair of laterally spaced-apart depending hinge plates 23 in which a transverse shaft 24 is rotatably journalled at a point located radially inwardly of the periphery of orifice 13. Shaft 24 carries a centrally positioned, downwardly extending arm or link 25 having its outer end portion 26 turned rearwardly at an angle to arm 25, the angle on the forward edge of link 25 being defined by a rounded surface 27 adapted to bear against the center of back face 17 of the closure plate. End portion 26 is provided with a cylindrical opening 28 therethrough which is generally coaxial with the center of closure plate 15 and orifice 13. Opening 28 is adapted to receive a valve stem 29 which projects rearwardly from the center of closure plate 15 and carries a tubular bushing 30 receivable in opening 28 and clamped against back face 17 of the closure plate by means of a nut 31, which is screwed on to the rearward end of stem 29. Opening 28 is made with a stepped diameter to provide a smaller diameter forward portion 32 and a larger diameter rearward portion 33. The exterior of bushing 30 is likewise made to a stepped diameter to provide a smaller diameter forward portion 34, generally opposite portion 32 of opening 28, and a larger diameter portion 35 disposed generally opposite the larger diameter portion 33 of the opening. The stepped diameters of opening 28 define the annular rearwardly facing internal shoulder 36, while the stepped diameter of bushing 30 define the annular forwardly facing external shoulder 37, shoulders 36 and 37 being in generally axially opposed relation.

The diameters of sections 32 and 33 of opening 28 are made appreciably larger than the diameters of the related sections 34 and 35 of the bushing so as to provide appreciable clearance between opening 28 and bushing 30, whereby to provide for lost-motion between arm 25 and valve stem 29, for purposes which will appear hereinafter.

A pair of coil springs 38 are mounted about shaft 24 on opposite sides of arm 25. Springs 38 have portions 39 at one end bearing against bracket 21 and reversely bent portions 40 at the opposite ends hooked over lugs 41 extending laterally from opposite sides of hinge arm 25. With this arrangement the springs serve to continuously resiliently bias arm 25 against the back face of plate 15, thereby urging the latter toward the closed position.

In operation, closure plate 15 and its seal ring 20 will initially be held in place against seat 14 by the force of springs 38 reacting between bracket 21 and arm 25 through rounded surface 27 on the back face of the closure plate. The center of surface 27 will be generally coincident with the centers of plate 15 and body 10.

As the fluid pressure on the upstream or forward face 16 of the closure plate rises above that on the downstream or back face 17 of the closure plate, a generally uniform pressure will be exerted over the entire forward face 16. Theoretically this force will correspond to a single force component acting normal to closure plate 15 at the center of forward face 16. As the force at this point overcomes the spring force exerted at the center of surface 27, the closure plate will move substantially uniformly directly away from seat 14 until the closure plate reaches the position indicated by the broken lines in FIG. 2. This movement is uniform, without wiping action of seal 20 across seat face 14 because the closure plate will be flow stabilized. That is, starting with an equal pressure differential across the entire forward face of plate 15 opposed by a single force at the center thereof, the initial movement of the closure plate will necessarily be substantially uniform. As minute inequalities of movement, i.e., a slight tilting of the closure plate away from a plane parallel to the seat face, occurs, there is a corresponding restriction to flow at the point where the closure plate is closest to the seat face. This restriction increases the pressure differential across the closure plate at this point with a resultant localized force increase tending to push the plate farther away from the seat face until the pressure drop around the entire circumference of the closure plate is again equal.

Concurrent with initial movement of the closure plate, there occurs initial swinging movement of arm 25 around the axis of shaft 24. This swing does not effect the stabilization and parallelism between the closure plate and seat 14 until the rotation of arm 25 exceeds approximately 3°, as determined by the annular clearance between bushing 30 and opening 28. At this point the free gimballing action between the closure plate and bushing 30, which is mounted rigidly to the plate, reaches the limit of movement allowed by the annular clearance between bore portion 32 and bushing portion 34, whereupon the closure plate and arm 25 become essentially a rigid member. As the upstream flow pressure continues to increase, closure plate 15 and arm 25 will continue to rotate about the axis of shaft 24 until a position corresponding to about 60° of rotation is attained (shown in broken lines in FIG. 3).

At the latter position, rear face 17 of the closure plate will contact the curved, cam-like leading edges 42—42 of the hinge plates. As the hinge arm continues its rearward rotation, the closure plate will slide around the curved surfaces 42—42 toward the tips 43—43. The reaction to the contact of the back face of the closure plate on surfaces 42—42 causes a movement of the closure plate away from arm 25 and a sliding motion forward of bushing 30 in the clearance area 28 of the link. This motion continues until shoulders 36 and 37 come into engagement.

When the closure plate has moved to the full open position (full lines, FIG. 3), the closure plate and arm 25 have again become essentially a rigid member by virtue of the engagement of the step shoulders 36 and 37. A positive non-jamming stop will be achieved by contact of rear face 17 with end faces 43 of the hinge plates. At this point the plane of the closure plate will be about 3° less than parallel with the plane through the center line of body 10 and the attached pipe. This precludes contact of the edge of the closure plate with the wall of the downstream piping and prevents over-travel and jamming which might result in failure of the valve to close in the event of spring failure and a sudden reversal of flow.

In returning to closed position as the upstream pressure wanes and the flow velocities holding the closure plate fully open slacken, the spring force acting through surface 27 against the center of back face 17 starts rotation of the closure plate toward the closed position. Normally, as the closure plate approaches the broken line position shown in FIG. 2, the plane of the closure plate again becomes flow stabilized substantially parallel to seat face 14 until the spring force overcomes the small positive pressure on the closure plate and seal 20 again contacts seat 14 without any wiping motion therebetween.

The inclined or bevelled edge 44 of the closure plate provides a safety feature, in that if both springs 38 should fail completely when the closure plate is in the open position, the plate would return to the closed position only after a reversal of flow produced a force acting on the back face of the closure plate. Without the spring force acting against a positive upstream pressure to stabilize the closure plate in a plane parallel to seat face 14 prior to complete closure, it would be possible for the closure plate to swing in at an angle and contact the edge of orifice 13, as shown in FIG. 4, and be jammed thereby in the partially open position. By inclining or chamfering the plate periphery as at 44 at an angle of 30°, this possible jamming action will be precluded, as the inclined surface engaging the edge of orifice 13 will produce a sliding action between these surfaces, causing the edge of the plate to slide rearwardly over the edge of orifice 13 and assume its normal parallel fully closed position. The closure plate can thus not be jammed in the partially open position.

From the foregoing, it will be evident that this invention provides a check valve construction capable of fully accomplishing the several objects set forth hereinabove and providing a highly useful valve.

It will be understood that various changes and modifications may be made in the details of the illustrative embodiments within the scope of the appended claims but without departing from the spirit of this invention.

What we claim and desire to secure by Letters Patent is:

1. In a check valve, an annular body defining a flow port and having a flat rearwardly facing seating face perpendicular to the axis of said port, a circular closure plate cooperable with the seat for controlling fluid flow through the port, hinge means connecting said closure plate to the body for swinging movement toward and away from the seat, said hinge means including a radial hinge arm rotatably mounted to the body and having a free end disposed at the center of the back face of the closure plate, the pivot for said hinge arm being disposed transversely of said body and located radially inwardly of the periphery of said flow port, means resiliently biasing said free end against the closure plate, and a lost-motion connection between said free end and said closure plate constructed and arranged to permit a limited degree of angular movement of said closure plate relative to said hinge arm during initial opening and final closing movement of said closure plate over a predetermined limited distance relative to said seat, the peripheral edge of said closure plate being conically tapered toward the forward face of the plate at an angle with respect to the axis of the plate as will prevent jamming engagement between said edge and the edge of said seat defining said flow port during closing movement of said closure plate.

2. In a check valve according to claim 1, wherein said lost-motion connection includes a stem projecting axially from the back face of said closure plate, an opening through said free end of the hinge arm dimensioned to freely receive said stem, said opening and the received portion of said stem having stepped diameter portions defining cooperating shoulders engageable when the closure plate exceeds said limited distance to rigidify the connection between the closure plate and the hinge arm throughout the remainder of the travel of the closure plate relative to the seat.

3. In a check valve according to claim 1, wherein said hinge means includes transversely spaced parallel hinge plates extending radially from said body rearwardly of said closure plate, and a transverse shaft rotatably journalled between the hinge plates and secured to said hinge arm.

4. In a check valve according to claim 3, wherein said hinge plates have rearwardly curving leading edges terminating in tip portions engageable by the back face of said closure plate during its opening movement to limit such movement to the attainment of a non-jamming position in said body.

5. In a check valve according to claim 1, an annular elastomeric seal element seated in the forward face of the closure plate adjacent the periphery thereof in position to seal with said seat about said port.

6. A check valve, comprising, an annular body, an annular seat in the body defining a flow port, a circular closure plate cooperable with the seat for controlling fluid flow through the port, hinge means pendently connecting the closure plate to an upper side of the body for swinging movement toward and away from said seat, said hinge means including a hinge bracket secured transversely of said upper side of the body and including transversely spaced apart downwardly extending plates, a transverse shaft rotatably journalled between the hinge plates, a hinge arm depending from the shaft and having a free end, means resiliently biasing said free end of the hinge arm toward the closure plate, a lost-motion connection between said free end and said closure plate, said lost-motion connection including stem means extending rearwardly from said plate and coaxially therewith, an opening in said free end of the hinge arm to receive said stem means, the diameter of said opening being sufficiently greater than that of said stem to form a clearance adapted to permit a limited degree of angular movement of said closure plate relative to said hinge arm, and cooperating shoulder means in the bore of the opening and on said stem engageable when the closure plate attains a pre-determined distance from said seat to rigidify the connection between the plate and the hinge arm during the remainder of the travel of the closure plate relative to the seat.

References Cited
UNITED STATES PATENTS

| | | | |
|---|---|---|---|
| 298,865 | 5/1884 | Leng | 251—86 |
| 662,711 | 11/1900 | Dewar | 137—527 |
| 940,182 | 10/1909 | Morgan | 137—527 |
| 2,419,318 | 4/1947 | Johnson | 137—527 |
| 2,482,198 | 9/1949 | Melichar | 137—527 |
| 2,744,539 | 5/1956 | Jones | 137—527.4 |
| 2,767,735 | 10/1956 | Darling | 137—454.2 |
| 3,172,424 | 3/1965 | Stillwagon | 137—527.4 |

WILLIAM F. O'DEA, *Primary Examiner.*

W. WRIGHT, *Assistant Examiner.*